US011235809B2

(12) United States Patent
Mo et al.

(10) Patent No.: US 11,235,809 B2
(45) Date of Patent: Feb. 1, 2022

(54) VEHICLE BODY FOR VEHICLES

(71) Applicants: Hyundai Motor Company, Seoul (KR); Kia Motors Corporation, Seoul (KR)

(72) Inventors: Jin Young Mo, Hwaseong-si (KR); Ji Ae Yong, Gangneung-si (KR); Ho Yeon Kim, Daegu (KR); Chul Hee Heo, Hwaseong-si (KR); Won Oh Kim, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/928,511

(22) Filed: Jul. 14, 2020

(65) Prior Publication Data
US 2021/0171114 A1    Jun. 10, 2021

(30) Foreign Application Priority Data

Dec. 5, 2019  (KR) .......................... 10-2019-0160981

(51) Int. Cl.
*B62D 23/00*    (2006.01)
*B62D 25/04*    (2006.01)
(Continued)

(52) U.S. Cl.
CPC ............ *B62D 23/005* (2013.01); *B62D 21/11* (2013.01); *B62D 21/15* (2013.01); *B62D 25/025* (2013.01); *B62D 25/04* (2013.01); *B62D 27/02* (2013.01)

(58) Field of Classification Search
CPC .... B62D 23/005; B62D 23/04; B62D 23/025; B62D 23/08; B62D 21/152; B60Y 2304/07
(Continued)

(56) References Cited

U.S. PATENT DOCUMENTS

| 5,332,281 A | 7/1994 | Janotik et al. |
| 6,695,368 B1 | 2/2004 | Weykamp et al. |

(Continued)

FOREIGN PATENT DOCUMENTS

| DE | 102005026791 A1 | 1/2007 | |
| EP | 1329374 A1 * | 7/2003 | ............. B62D 25/04 |

(Continued)

*Primary Examiner* — Dennis H Pedder
(74) *Attorney, Agent, or Firm* — Slater Matsil, LLP (57) ABSTRACT

A vehicle body of a vehicle includes pillar members forming a frame at opposite sides of an upper portion of the vehicle body, respectively, side reinforcing members connected to intermediate connecting points of the pillar members, wherein the side reinforcing members form a frame at opposite sides of a lower portion of the vehicle body, respectively, and load absorption members, to which suspension mounting sections are fixed, respectively, a first end of each of the load absorption members being connected to an end of a corresponding one of the pillar members and a second end of each of the load absorption members being connected to an intermediate connecting point of a corresponding one of the side reinforcing members, wherein a triangular truss support structure is formed through connection of each load absorption member with the corresponding pillar member and the corresponding side reinforcing member.

15 Claims, 6 Drawing Sheets

(51) Int. Cl.
    *B62D 25/02*     (2006.01)
    *B62D 21/15*     (2006.01)
    *B62D 27/02*     (2006.01)
    *B62D 21/11*     (2006.01)

(58) Field of Classification Search
    USPC .................................. 296/205, 209, 193.06
    See application file for complete search history.

(56) References Cited

U.S. PATENT DOCUMENTS

| | | |
|---|---|---|
| 6,926,350 B2 | 8/2005 | Gabbianelli et al. |
| 7,758,107 B2 | 7/2010 | Ratsos et al. |
| 9,505,293 B2 | 11/2016 | Bowles et al. |
| 9,849,920 B2 | 12/2017 | Kawata et al. |
| 10,618,489 B2 | 4/2020 | Hisamura et al. |
| 2001/0000119 A1 | 4/2001 | Jaekel et al. |
| 2006/0192375 A1 | 8/2006 | Davis et al. |
| 2009/0121106 A1 | 5/2009 | An |
| 2013/0277137 A1 | 10/2013 | Kawaguchi et al. |
| 2021/0171125 A1 | 6/2021 | Yong et al. |

FOREIGN PATENT DOCUMENTS

| | | | |
|---|---|---|---|
| FR | 2822431 A1 | | 9/2002 |
| JP | 04011581 A | * | 1/1992 |
| JP | 2013208968 A | | 10/2013 |
| KR | 100243584 B1 | | 3/2000 |
| KR | 20090035148 A | | 4/2009 |
| WO | 2010071664 A1 | | 6/2010 |

* cited by examiner

VEHICLE BODY FOR VEHICLES

CROSS-REFERENCE TO RELATED APPLICATIONS

This application claims priority to Korean Patent Application No. 10-2019-0160981, filed on Dec. 5, 2019, which application is hereby incorporated herein by reference.

TECHNICAL FIELD

The present invention relates to a vehicle body for vehicles capable of securing rigidity while simplifying assembly thereof.

BACKGROUND

A monocoque vehicle body structure formed by cutting out only a rear door portion from a general vehicle design is applied to vehicle body structures of existing miniature vehicles.

However, for production of a vehicle body having a general monocoque type vehicle body structure formed by eliminating only a rear door portion, machining of elements through pressing using pressing molds and welding the machined elements are required. For this reason, there are drawbacks in that large-scale plant and equipment investment for a press factory, a vehicle body welding factory, a painting factory, etc. is required, and freedom of design is low.

In particular, when various products should be manufactured in reduced numbers in association with production of existing vehicle bodies, increased design modification is required. For this reason, the number of molds is remarkably increased and, as such, there is a problem of increased manufacturing costs and difficulty securing rigidity.

Therefore, it is necessary to develop a new vehicle body structure capable of enhancing ease of assembly of a vehicle body in a smart factory environment and securing rigidity while coping with various designs.

The above matters disclosed in this section are merely for enhancement of understanding of the general background of the invention and should not be taken as an acknowledgement or any form of suggestion that the matters form the related art already known to a person skilled in the art.

SUMMARY

Therefore, embodiments of the present invention are directed to address problems in the art, and particular embodiments of the present invention provide a vehicle body for vehicles capable of securing rigidity while simplifying assembly thereof.

An embodiment of the present invention provides a vehicle body of a vehicle including pillar members forming a frame at opposite sides of an upper portion of the vehicle body, respectively, side reinforcing members connected to intermediate connecting points of the pillar members, thereby forming a frame at opposite sides of a lower portion of the vehicle body, respectively, and load absorption members, to which suspension mounting sections are fixed, respectively, each of the load absorption members being connected, at one end thereof, to an end of a corresponding one of the pillar members while being connected, at the other end thereof, to an intermediate connecting point of a corresponding one of the side reinforcing members, thereby forming a triangular truss support structure through a combination thereof with the corresponding pillar member and the corresponding side reinforcing member.

The load absorption member may be fixed to a side surface of a corresponding one of the suspension mounting sections to form a bottom surface of the truss support structure, respectively. A portion of each pillar member extending from an end of the pillar member to the intermediate connecting point of the pillar member may be formed to extend upwards at an incline toward a roof, thereby forming one inclined surface of the truss support structure. A portion of each side reinforcing member extending from an end of the side reinforcing member to the intermediate connecting point of the side reinforcing member may be formed to extend downwards at an incline, thereby forming the other inclined surface of the truss support structure.

A side surface of a front load absorption member of each load absorption member may be fixed to an outer side surface of a front suspension mounting section of the corresponding suspension mounting section. A front end of a corresponding one of the pillar members may be connected to a front-end upper surface of the front load absorption member. A front end of each side reinforcing member may be connected to the intermediate connecting point of a corresponding one of the pillar members at a rear surface of the pillar member. A rear end of the front load absorption member may be connected to the intermediate connecting point of a corresponding one of the side reinforcing members at a front surface of the side reinforcing member.

A side surface of a rear load absorption member of each load absorption member may be fixed to an outer side surface of a rear suspension mounting section of the corresponding suspension mounting section. A rear end of the rear load absorption member may be connected to a front surface of a connecting member disposed to extend in a lateral direction. A rear end of the pillar member corresponding to an end of the connecting member may be connected to an upper surface of the end of the connecting member. A rear end of each side reinforcing member may be connected to the intermediate connecting point of the corresponding pillar member at the front surface of the pillar member. A front end of the rear load absorption member may be connected to the intermediate connecting point of the corresponding side reinforcing member at a rear surface of the side reinforcing member.

A front pillar member of the pillar member connected to a front suspension mounting section of the corresponding suspension mounting section may be formed to have a tubular shape having a closed cross-sectional structure. A rear pillar member of the pillar member, the load absorption member and the side reinforcing member connected to the rear suspension mounting section of the corresponding suspension mounting section may be formed to have a tubular shape having an opened cross-sectional structure opened at one surface thereof.

Fastening plates may be fixed to ends of the load absorption members, the side reinforcing members, and the front and rear pillar members, respectively, such that each fastening plate has a shape covering a longitudinal end portion of the corresponding member. Each fastening plate may be separately fastened to the corresponding member, to which the fastening plate will be connected, by a fastening member in a state in which the fastening plate contacts an outer surface of the member.

A side surface of a rear load absorption member of each load absorption member may be fixed to an outer side surface of a rear suspension mounting section of the corresponding suspension mounting section. A rear end of each pillar member may be connected to an upper surface of an end of the rear load absorption member of the corresponding load absorption member. A rear end of each side reinforcing member may be connected to a front surface of the intermediate connecting point of the corresponding pillar member. A front end of the rear load absorption member of each load absorption member may be connected to a rear surface of the intermediate connecting point of the corresponding side reinforcing member.

In accordance with embodiments of the present invention, triangular truss support structures are realized at portions of the vehicle body supporting the suspension mounting section and, as such, the truss structures function as a load path of a load input from the suspensions or impact energy input from the outside of the vehicle. Accordingly, it may be possible to effectively distribute and absorb impact energy and, as such, it may be possible not only to secure rigidity of the vehicle body, but also to enhance driving performance and steering performance of the vehicle.

In addition, the triangular truss support structures are connected by the pillar members and the side reinforcing members connecting the front and rear structures to the passenger compartment and, as such, connection at the associated portions of the vehicle may be reinforced. Accordingly, it may be possible not only to enhance torsional rigidity, but also to enhance durability.

In accordance with embodiments of the present invention, the vehicle body is configured through assembly of members using bolting or riveting. Accordingly, large-scale pressing, vehicle body welding, and painting factories are unnecessary and, as such, manufacture of the vehicle body may appropriately cope with a smart factory environment. In addition, the assembly process of the vehicle body may be simplified and, as such, ease of assembly may be enhanced. In addition, torsional rigidity of assembled portions may be greatly enhanced and, as such, desired strength and rigidity of the vehicle body may be secured.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
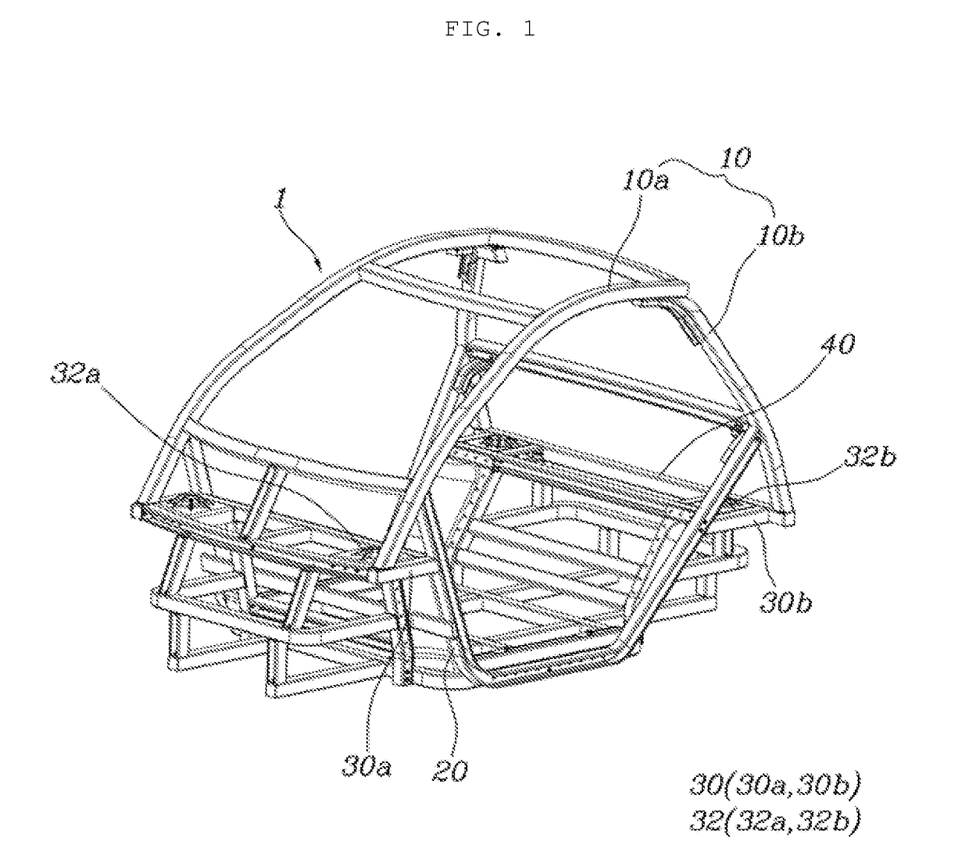
FIG. 1 is a view illustrating a vehicle body according to an embodiment of the present invention.
Figure 2:
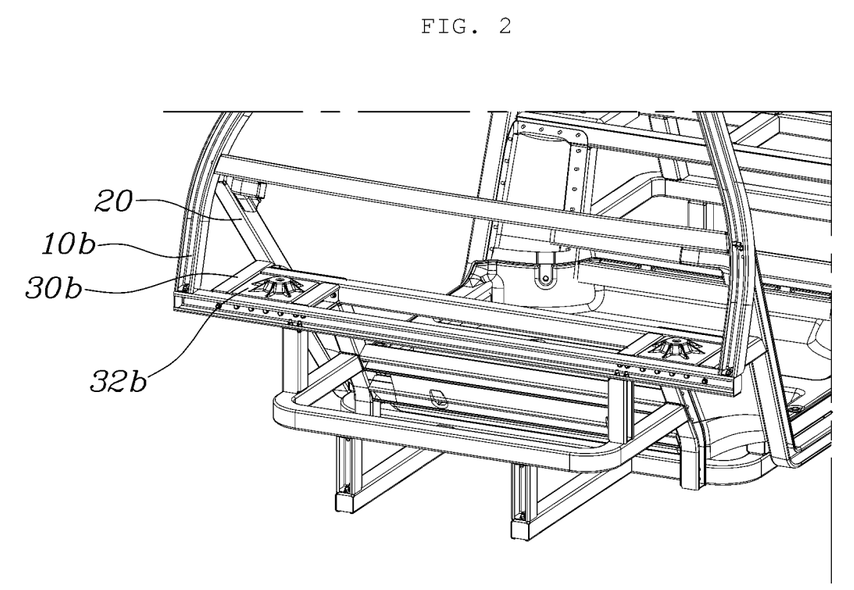
FIG. 2 is a view illustrating a rear portion of the vehicle body according to the illustrated embodiments of the present invention.
Figure 3:
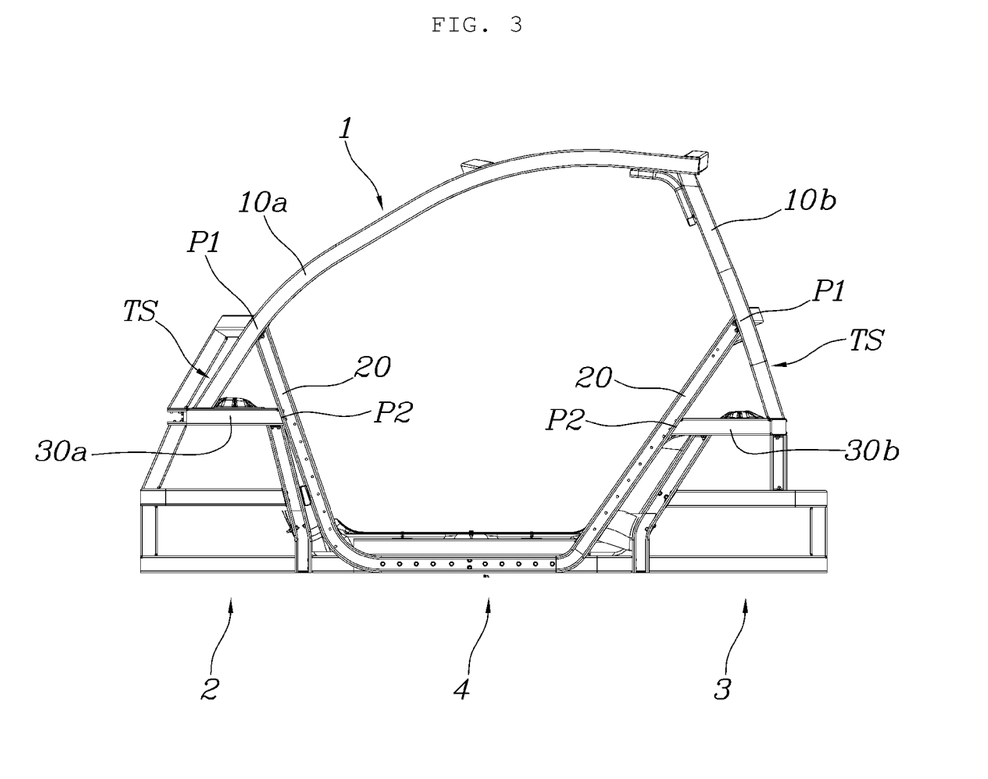
FIG. 3 is a view illustrating coupling relations of members forming a triangular truss support structure.

FIG. 1 is a view illustrating a vehicle body according to an embodiment of the present invention. FIG. 2 is a view illustrating a rear portion of the vehicle body according to the illustrated embodiments of the present invention. FIG. 3 illustrates coupling relations of members forming a triangular truss support structure TS.

Referring to FIG. 1, an embodiment of the present invention is applicable to a vehicle body 1 of a miniature electric vehicle. A module is constituted through connection of members. As shown in FIG. 3, the module may mainly be divided into a front floor module 2, a rear floor module 3, a center floor module 4, and a pillar side module (designated by no reference numeral).

The front floor module 2 supports a front structure including front suspension mounting sections 32a configured to support an upper end of a front suspension strut. The rear floor module 3 supports a rear structure including rear suspension mounting sections 32b configured to support an upper end of a rear suspension strut.

In addition, the center floor module 4 is connected between a lower portion of the front floor module 2 and a lower portion of the rear floor module 3, to form a bottom of a passenger compartment. The pillar side module is connected between an upper portion of the front floor module 2 and an upper portion of the rear floor module 3 while being connected, at a lower end thereof, to the center floor module 4, to form an upper portion of the passenger compartment.

In particular, the pillar side module includes pillar members 10 and side reinforcing members 20. In accordance with the illustrated embodiment of the present invention, load absorption members 30 are cooperatively connected to the pillar members 10 and the side reinforcing members 20 and, as such, triangular truss structures supporting the suspension mounting section 32 are realized.

Referring to FIGS. 1 to 3, the pillar members 10 are installed to be connected to a roof at opposite sides of an upper portion of the vehicle body 1, thereby forming a frame.

In this case, each pillar member 10 may include a front pillar member 10a and a rear pillar member 10b. The front pillar member 10a is connected, at a front end thereof, to the front floor module 2 supporting the front structure. The front pillar member 10a is also connected, at a rear end thereof, to a front end of the rear pillar member 10b. The rear pillar member 10b is connected, at a rear end thereof, to the rear floor module 3 supporting the rear structure.

Each side reinforcing member 20 is connected to intermediate connecting points P1 respectively disposed near opposite ends of a corresponding one of the pillar members 10. The side reinforcing members 20 form a frame at opposite sides of a lower portion of the vehicle body 1.

For example, each side reinforcing member 20 is connected, at a front end thereof, to the intermediate connecting point P1 of the corresponding front pillar member 10a. In addition, each side reinforcing member 20 is connected, at a rear end thereof, to the intermediate connecting point P1 of the corresponding rear pillar member 10b.

In particular, each load absorption member 30 is a member installed to extend in forward and rearward directions of the vehicle and fixed to a side surface of a corresponding one of suspension mounting sections 32. The load absorption member 30 is connected, at one end thereof, to one end of the corresponding pillar member 10 while being connected, at the other end thereof, to an intermediate connecting point P2 of the corresponding side reinforcing member 20. Thus, combination of the load absorption members 30 with the pillar members 10 and the side reinforcing members 20 forms triangular truss support structures TS.

For reference, each pillar member 10 is formed to extend upwards from opposite ends thereof toward the roof. In addition, each side reinforcing member 20 is outwardly diverged toward opposite ends thereof and, as such, has a U-shape. Accordingly, each truss support structure TS may have a triangular shape in which acute angles are formed at three apexes, respectively.

As described above, in accordance with the illustrated embodiments of the present invention, corresponding ones of the pillar members 10 and the corresponding side reinforcing members 20 extend under the condition that ends of each pillar member 10 and the corresponding side reinforcing member 20 are not aligned with each other, and each end of each pillar member 10 and an intermediate portion of the corresponding side reinforcing member 20 disposed near the end of the pillar member 10 are connected to a corresponding one of the load absorption members 30 to which the suspension mounting sections 32 are fixed, respectively. Thus, triangular truss support structures TS are realized. Accordingly, a load input from a suspension or impact energy input from the outside of the vehicle may be effectively distributed through the truss support structures TS and, as such, rigidity of the vehicle body 1 is secured.

In addition, portions of the vehicle body 1, at which the front/rear structure is connected to the passenger compartment, are important portions of the vehicle body 1 that require torsional rigidity. Since connection of the triangular truss support structures TS is achieved by the pillar members 10 and the side reinforcing members 20 connecting the front and rear structures to the passenger compartment, connection of the connecting portions of the vehicle body 1 is enhanced and, as such, torsional rigidity and durability are enhanced.

FIG. 3 is a view illustrating coupling relations of the members constituting each triangular truss support structure TS according to the illustrated embodiments of the present invention.

Referring to FIG. 3, the load absorption members 30 are fixed to side surfaces of the suspension mounting sections 32 to form bottom surfaces of truss support structures TS, respectively.

In addition, in association with each truss support structure TS, a portion of each pillar member 10 extending from each end of the pillar member 10 to the intermediate connecting point P1 of the pillar member 10 near the end of the pillar member 10 is formed to extend upwards at an incline toward the roof, thereby forming one inclined surface of the truss support structure TS.

In addition, in association with each truss support structure TS, a portion of each side reinforcing member 20 extending from each end of the side reinforcing member 20 to the intermediate connecting point P2 of the side reinforcing member 20 near the end of the side reinforcing member 20 is formed to extend downwards at an incline, thereby forming the other inclined surface of the truss support structure TS.

That is, each load absorption member 30 forms a bottom surface, the portion of each pillar member extending from each end of the pillar member 10 to the corresponding intermediate connecting point P1 of the pillar member 10 forms one inclined surface, and the portion of each side reinforcing member 20 extending from each end of the side reinforcing member 20 to the corresponding intermediate connecting point P2 of the side reinforcing member 20 forms the other inclined surface.

In this case, the length of the pillar member portion extending from each end of the pillar member 10 to the corresponding intermediate connecting point P1 of the pillar member 10 and the length of the reinforcing member portion extending from each end of the side reinforcing member 20 to the corresponding intermediate connecting point P2 of the side reinforcing member 20 are similar to the length of the load absorption member 30 and, as such, a triangular truss support structure TS is formed.

As described above, in accordance with the illustrated embodiments of the present invention, a trust support structure TS is realized using only portions of members connected to each load absorption member 30 and, as such, the space needed to realize a truss structure may be reduced and minimized, thereby enabling miniaturization of the structure of the vehicle body 1. In particular, in spite of such a truss structure having a small size, energy distribution may be efficiently achieved and, as such, rigidity of the vehicle body 1 may be effectively secured.

Figure 4:
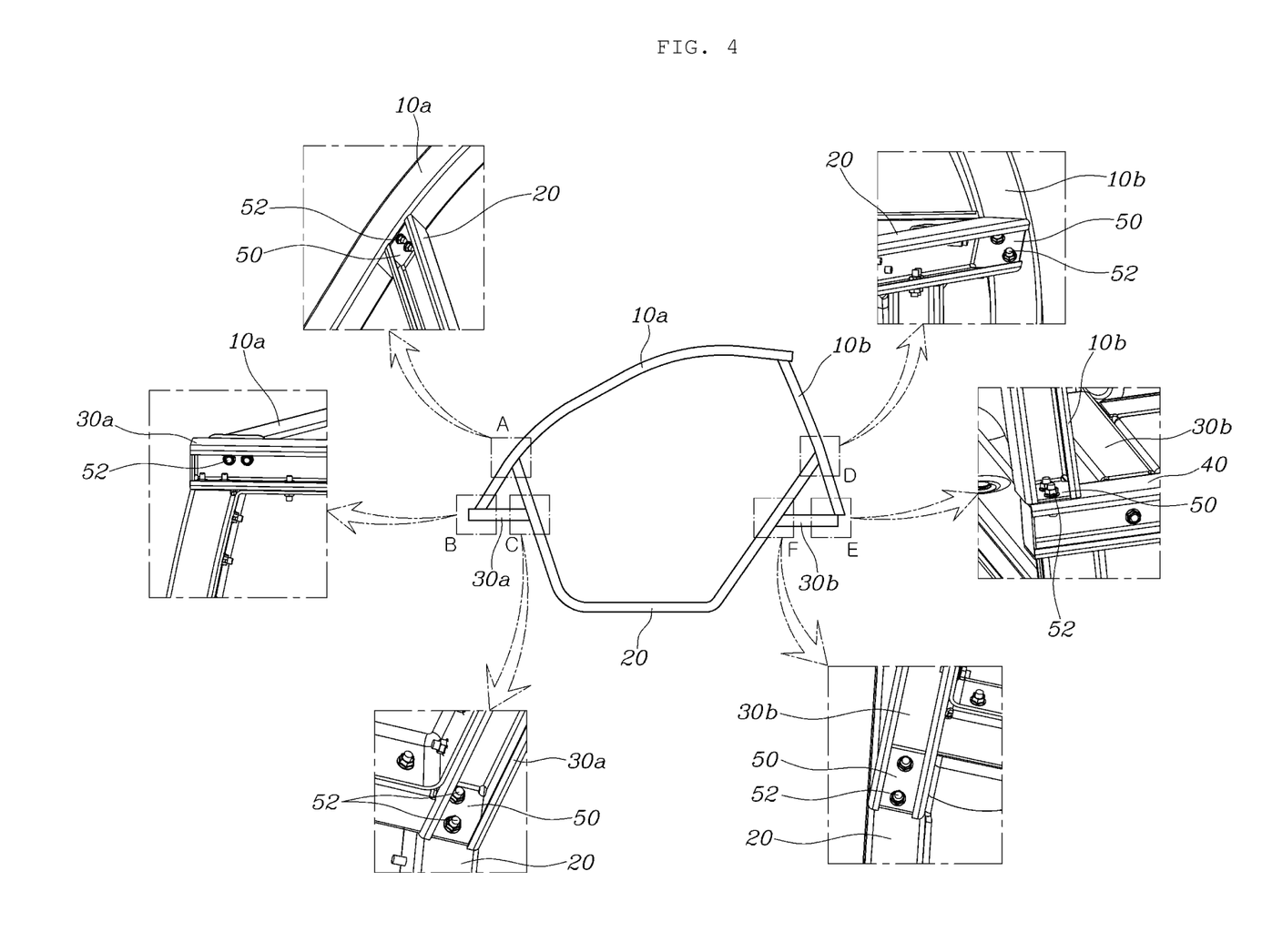
FIG. 4 is a view illustrating coupling structures of members according to the illustrated embodiments of the present invention.

FIG. 4 is a view illustrating coupling structures of members according to the illustrated embodiments of the present invention.

Each truss support structure TS provided between the front structure and the passenger compartment will be described with reference to FIG. 4. A side surface of each front load absorption member 30a is fixed to an outer side surface of the corresponding front suspension mounting section 32a. The front end of each pillar member 10 is connected to a front-end upper surface of the corresponding front load absorption member 30a.

The front end of each side reinforcing member 20 is connected to the intermediate connecting point P1 of the corresponding pillar member 10 at a rear surface of the pillar member 10. The rear end of the front load absorption member 30a is connected to the intermediate connecting point P2 of the side reinforcing member 20 at a front surface of the side reinforcing member 20.

That is, an end of each front pillar member 10a is supported by an outer surface of the corresponding front load absorption member 20a, and an end of each side reinforcing member 20 is supported by an outer surface of the corresponding front pillar member 10a. In addition, an end of each front load absorption member 20a is supported by an outer surface of the corresponding side reinforcing member 20.

In such a manner, the members constituting one truss support structure TS are coupled such that one end of each member is seated on the outer surface of another member, to form a triangular shape. As a result, support force among the members is enhanced and, as such, a load input to the truss support structure TS may be more effectively distributed.

Next, each truss support structure TS provided between the rear structure and the passenger compartment will be described with reference to FIG. 4. A side surface of each rear load absorption member 30b is fixed to an outer side surface of the corresponding rear suspension mounting section 32b. A rear end of the rear load absorption member 30b is connected to a front surface of a connecting member 40 disposed to extend in a lateral direction.

In addition, a rear end of the pillar member 10 corresponding to an end of the connecting member 40 is connected to an upper surface of the end of the connecting member 40. A rear end of each side reinforcing member 20 is connected to the intermediate connecting point P1 of the corresponding pillar member 10 at the front surface of the pillar member 10. A front end of the rear load absorption member 30b is connected to the intermediate connecting point P2 of the corresponding side reinforcing member 20 at a rear surface of the side reinforcing member 20.

That is, the rear end of each rear load absorption member 30b is supported by one outer surface of the connecting member 40, and the end of each rear pillar member 10b is supported by the other outer surface of the connecting member 40. In addition, the end of each side reinforcing member 20 corresponding to the rear pillar member 10b is supported by the outer surface of the rear pillar member 10b, and a front end of the rear load absorption member 30b corresponding to the side reinforcing member 20 is supported by the outer surface of the side reinforcing member 20.

Of course, although the connecting member 40 is connected between the rear pillar member 10b and the rear load absorption member 30b in the case of the rear truss support structure TS, the rear truss support structure TS may be configured in such a manner that the rear pillar member 10b is directly supported by the rear load absorption member 30b without using the connecting member 40, similarly to the front truss support structure TS.

That is, in this case, the side surface of the rear load absorption member 30b is fixed to the outer side surface of the rear suspension mounting section 32b, and the rear end of the rear pillar member 10b is connected to the upper surface of the rear end of the rear load absorption member 30b.

In addition, the rear end of the side reinforcing member 20 may be connected to the intermediate connecting point P1 of the rear pillar member 10b at the front surface of the rear pillar member 10b, and the front end of the rear load absorption member 30b may be connected to the intermediate connecting point P2 of the side reinforcing member 20 at the rear surface of the side reinforcing member 20.

For reference, the connecting member 40 may be applied to connect the above-described members or other connecting members, may be applied to sections for assembly of chassis/internal elements/external elements, or may be applied to sections to be locally reinforced for rigidity enhancement.

Referring to FIG. 4, the front pillar member 10a connected to the front suspension mounting section 32a is formed to have a tubular shape having a closed cross-sectional structure.

Meanwhile, the rear pillar member 10b, the load absorption member 20 and the side reinforcing member 20 connected to the rear suspension mounting section 32b are formed to have a tubular shape having an opened cross-sectional structure opened at one surface thereof.

That is, members requiring strength and rigidity of predetermined levels or more among the members constituting the vehicle body 1 are formed to have a pipe shape having a closed cross-sectional structure, and the remaining members are formed to have a pipe shape having an opened cross-sectional structure. Accordingly, it may be possible to optimize the weight/cost/structure of the vehicle while securing basic performance of the vehicle body 1, that is, strength and rigidity.

In addition, fastening plates 50 are fixed to ends of the load absorption members 30, the side reinforcing members 20, and the front and rear pillar members 10a and 10b, respectively. Each fastening plate 50 has a shape covering a longitudinal end portion of the corresponding member.

Each fastening plate 50 is separately fastened to the corresponding member, to which the fastening plate 50 will be connected, by a fastening member 52 in a state in which the fastening plate 50 contacts an outer surface of the member.

In this case, the end of each member may be formed to be matched with an angle at which the end of the member is seated on an outer surface of another member to which the former member is coupled. For example, the end of the member may be formed to have a cut shape perpendicular to or inclined from a longitudinal direction of the member.

Meanwhile, each fastening plate 50 may be formed to have a quadrangular plate shape having a cross-sectional area equal to or greater than a cross-sectional area of the end of the corresponding member. The fastening plate 50 may be separately prepared, or may be folded after being integrally formed at the end of the corresponding member.

In addition, the fastening member 52 may be a bolt/nut or a rivet. For efficient fastening, bolting holes may be formed at each fastening plate 50 and the corresponding member, respectively.

Hereinafter, a coupled structure of the members will be described with reference to FIG. 4. First, at a portion A of the vehicle body 1, the side reinforcing member 20 is coupled to the front pillar member 10a. The fastening plate 50 is fixed to the front end of the side reinforcing member 20 while having a shape covering the front end of the side reinforcing member 20. Bolting of the fastening plate 50 is carried out under the condition that the outer surface of the fastening plate 50 contacts the intermediate connecting point P1 of the front pillar member 10a at a lower portion of the front pillar member 10a.

In this case, the front pillar member 10a is a pipe having a closed cross-sectional structure and, as such, an insert nut may be fixed to an inner surface of the front pillar member 10a. One surface of the side reinforcing member 20 is formed to have an opened shape and, as such, a bolt may be fastened using a tool inserted through an opened portion of the side reinforcing member 20. Accordingly, an assembly task between the front pillar member 10a and the side reinforcing member 20 may be conveniently and simply carried out.

Next, at a portion B of the vehicle body 1, the front pillar member 10a is coupled to the front load absorption member 30a. The fastening plate 50 is fixed to the front end of the front pillar member 10a while having a shape covering the front end of the front pillar member 10a. Bolting of the fastening plate 50 is carried out under the condition that the outer surface of the fastening plate 50 contacts the upper surface of the front load absorption member 30a.

In this case, a nut is previously assembled to an inner surface of the fastening plate 50 such that the nut corresponds to the fastening hole formed at the fastening plate 50. Accordingly, a bolt may be coupled to the fastening hole.

In addition, one surface of the front load absorption member 30a is formed to have an opened shape and, as such, a bolt may be fastened using a tool inserted through an opened portion of the front load absorption member 30a. Accordingly, an assembly task between the front load absorption member 30a and the front pillar member 10a may be conveniently and simply carried out.

At a portion C of the vehicle body 1, the front load absorption member 30a is coupled to the side reinforcing member 20. The fastening plate 50 is fixed to the rear end of the front load absorption member 30a while having a shape covering the rear end of the front load absorption member 30a. Bolting of the fastening plate 50 is carried out under the condition that the outer surface of the fastening plate 50 contacts the intermediate connecting point P2 of the side reinforcing member 20 at the front surface of the side reinforcing member 20.

In this case, each of the side reinforcing member 20 and the front load absorption member 30a is formed to have an opened shape at one surface thereof and, as such, a bolt may be fastened using a tool inserted through an opened portion of the front load absorption member 30a. Accordingly, an assembly task between the side reinforcing member 20 and the front load absorption member 30a may be conveniently and simply carried out.

For reference, at a portion D of the vehicle body 1, the side reinforcing member 20 is coupled to the rear pillar member 10b. At a portion E of the vehicle body 1, the rear pillar member 10b and the rear load absorption member 30b are coupled. At a portion F of the vehicle body 1, the rear load absorption member 30b is coupled to the side reinforcing member 20. Coupling structures of these portions are formed through coupling methods which are substantially the same as those of the portions A, B and C and, as such, no description thereof will be given.

As described above, in accordance with embodiments of the present invention, the vehicle body 1 is configured through assembly of members using bolting or riveting. Accordingly, large-scale pressing, vehicle body welding, and painting factories are unnecessary and, as such, manufacture of the vehicle body may appropriately cope with a smart factory environment. In addition, the assembly process of the vehicle body 1 may be simplified and, as such, ease of assembly may be enhanced. In addition, torsional rigidity of assembled portions may be greatly enhanced and, as such, desired strength and rigidity of the vehicle body 1 may be secured.

Figure 5:
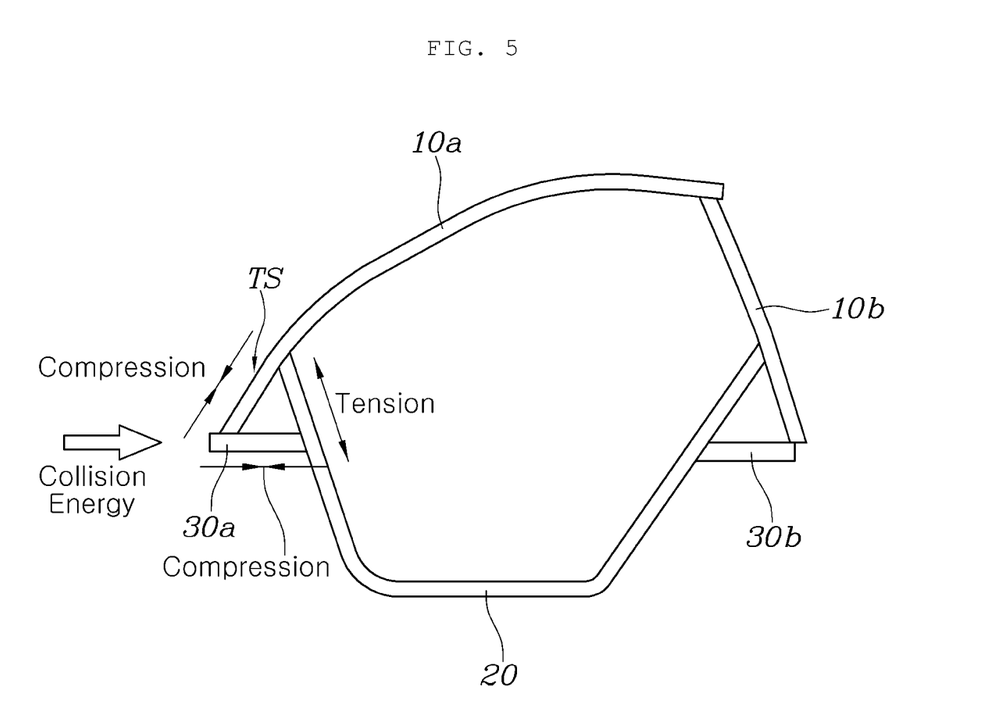
FIG. 5 is a view explaining impact energy absorption by the truss support structure of embodiments of the present invention.

Meanwhile, FIG. 5 is a view explaining impact energy absorption by the truss support structure TS of embodiments of the present invention.

Referring to FIG. 5, when collision occurs at a front portion of the vehicle, collision energy is transmitted to the front load absorption members 30a and the front pillar members 10a constituting front truss support structures TS in a distributed manner, and is then transferred to the side reinforcing members 20.

In this case, the front load absorption members 30a, the front pillar members 10a, and the side reinforcing members 20 constituting respective truss structures function as load paths in a compression or tension direction and, as such, collision energy is absorbed by the members. Thus, rigidity of the vehicle body 1 may be secured and, as such, collision performance may be enhanced.

Figure 6:
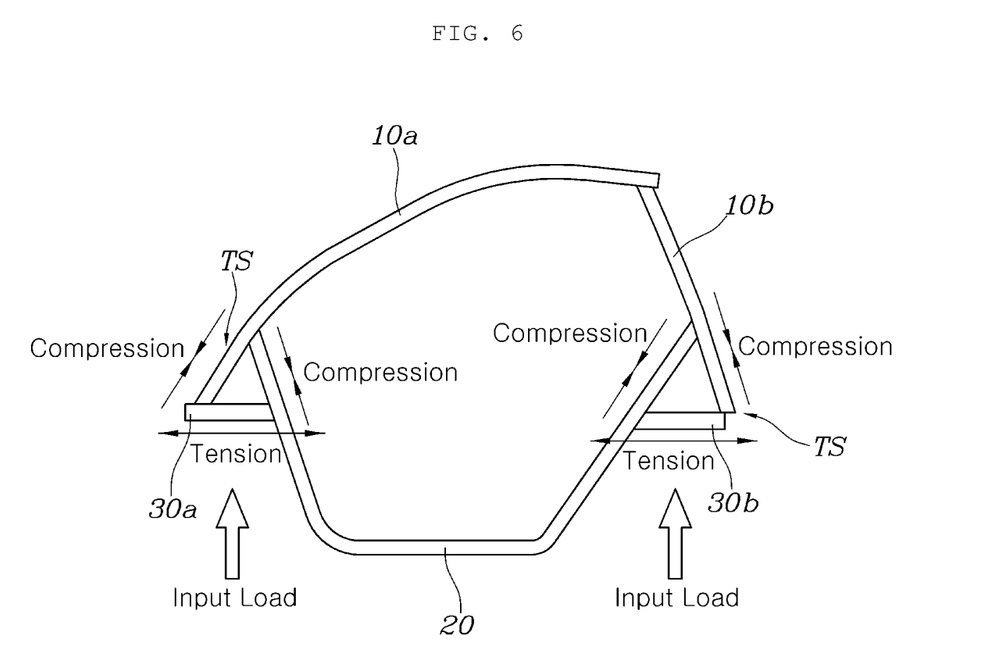
FIG. 6 is a view explaining load absorption by the truss support structures according to the embodiments of the present invention.

FIG. 6 is a view explaining load absorption by the truss support structures TS according to the embodiments of the present invention.

Referring to FIG. 6, when a great input load is generated at the front suspension mounting sections 32a and the rear suspension mounting sections 32b by front and rear suspensions of the vehicle, the input load is transmitted to the front and rear load absorption members 30a and 30b constituting the front and rear truss support structures TS, and is then transferred to the front and rear pillar members 10a and 10b and the side reinforcing members 20 in a distributed manner.

Accordingly, the front and rear load absorption members 30a and 30b, the front and rear pillar members 10a and 10b, and the side reinforcing members 20 constituting respective truss structures function as a load path in a compression or tension direction and, as such, an input load is absorbed by the members. Thus, rigidity of the vehicle body 1 may be secured and, as such, it may be possible not only to secure durability, but also to enhance driving performance and steering performance of the vehicle.

As is apparent from the above description, triangular truss support structures TS are realized at portions of the vehicle body 1 supporting the suspension mounting section 32 and, as such, the truss structures function as a load path of a load input from the suspensions or impact energy input from the outside of the vehicle. Accordingly, it may be possible to effectively distribute and absorb impact energy and, as such, it may be possible not only to secure rigidity of the vehicle body 1, but also to enhance driving performance and steering performance of the vehicle.

In addition, the triangular truss support structures TS are connected by the pillar members 10 and the side reinforcing members 20 connecting the front and rear structures to the passenger compartment and, as such, connection at the associated portions of the vehicle 1 is reinforced. Accordingly, it may be possible not only to enhance torsional rigidity, but also to enhance durability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle body of a vehicle comprising:
    pillar members forming a frame at opposite sides of an upper portion of the vehicle body, respectively;
    side reinforcing members connected to intermediate connecting points of the pillar members, wherein the side reinforcing members form a frame at opposite sides of a lower portion of the vehicle body, respectively;
    load absorption members, to which suspension mounting sections are fixed, respectively, a first end of each of the load absorption members being connected to an end of a corresponding one of the pillar members and a second end of each of the load absorption members being connected to an intermediate connecting point of a corresponding one of the side reinforcing members, wherein a triangular truss support structure is formed through connection of each load absorption member with the corresponding pillar member and the corresponding side reinforcing member;
    a front pillar member of the pillar member connected to a front suspension mounting section of the corresponding suspension mounting section is formed to have a tubular shape having a closed cross-sectional structure; and
    a rear pillar member of the pillar member, the load absorption member and the side reinforcing member connected to a rear suspension mounting section of the corresponding suspension mounting section are formed to have a tubular shape having an opened cross-sectional structure opened at one surface thereof, wherein fastening plates are fixed to ends of the load absorption members, the side reinforcing members, the front and rear pillar members, respectively, such that each fastening plate has a shape covering a longitudinal end portion of the corresponding load absorption member, side reinforcing member, front pillar member, or rear pillar member; and
    each fastening plate is separately fastened to the corresponding load absorption member, side reinforcing member, front pillar member, or rear pillar member, to which the fastening plate is connected, by a fastening member in a state in which the fastening plate contacts an outer surface of the corresponding load absorption member, side reinforcing member, front pillar member, or rear pillar member.

2. The vehicle body according to claim 1, wherein:
each load absorption member is fixed to a side surface of a corresponding one of the suspension mounting sections to form a bottom surface of the truss support structure, respectively;
a portion of each pillar member extending from an end of the pillar member to the intermediate connecting point of the pillar member extends upwards at an incline toward a roof to form a first inclined surface of the truss support structure; and
a portion of each side reinforcing member extending from an end of the side reinforcing member to the intermediate connecting point of the side reinforcing member extends downwards at an angle to form a second inclined surface of the truss support structure.

3. The vehicle body according to claim 1, wherein:
a side surface of a front load absorption member of each load absorption member is fixed to an outer side surface of a front suspension mounting section of the corresponding suspension mounting section;
a front end of a corresponding one of the pillar members is connected to a front-end upper surface of the front load absorption member;
a front end of each side reinforcing member is connected to the intermediate connecting point of a corresponding one of the pillar members at a rear surface of the pillar member; and
a rear end of the front load absorption member is connected to the intermediate connecting point of a corresponding one of the side reinforcing members at a front surface of the side reinforcing member.

4. The vehicle body according to claim 1, wherein:
a side surface of a rear load absorption member of each load absorption member is fixed to an outer side surface of a rear suspension mounting section of the corresponding suspension mounting section;
a rear end of the rear load absorption member is connected to a front surface of a connecting member disposed to extend in a lateral direction;
a rear end of the pillar member corresponding to an end of the connecting member is connected to an upper surface of the end of the connecting member;
a rear end of each side reinforcing member is connected to the intermediate connecting point of the corresponding pillar member at the front surface of the pillar member; and
a front end of the rear load absorption member is connected to the intermediate connecting point of the corresponding side reinforcing member at a rear surface of the side reinforcing member.

5. The vehicle body according to claim 1, wherein:
a side surface of a rear load absorption member of each load absorption member is fixed to an outer side surface of a rear suspension mounting section of the corresponding suspension mounting section;
a rear end of each pillar member is connected to an upper surface of an end of the rear load absorption member of the corresponding load absorption member;
a rear end of each side reinforcing member is connected to a front surface of the intermediate connecting point of the corresponding pillar member; and
a front end of the rear load absorption member of each load absorption member is connected to a rear surface of the intermediate connecting point of the corresponding side reinforcing member.

6. A vehicle body comprising:
pillar members connected to a roof at opposite first and second sides of an upper portion of the vehicle body, wherein the pillar members comprise:
a front pillar member having a front end connected to a front floor module, and
a rear pillar member having a front end connected to a rear end of the front pillar member and having a rear end connected to a rear floor module;
side reinforcing members connected to intermediate connecting points of the pillar members;
load absorption members extending in forward and rearward directions of the vehicle body, each load absorption member having a first end connected to one of the pillar members and a second end connected to one of the side reinforcing members; and
fastening plates fixed to ends of the load absorption members, the side reinforcing members, the front pillar member, and the rear pillar member.

7. The vehicle body according to claim 6, wherein each fastening plate has a quadrangular plate shape having a cross-sectional area equal to or greater than a cross-sectional area of the end of the corresponding load absorption member, side reinforcing member, front pillar member or rear pillar member to which the fastening plate is fixed.

8. The vehicle body according to claim 6, wherein:
the rear end of the front pillar member and the front end of the rear pillar member extend upwards toward a roof; and
each of the side reinforcing members has a U-shape.

9. The vehicle body according to claim 6, wherein the side reinforcing members comprise:
a first side reinforcing member having a front end connected to a first intermediate connecting point of a first front pillar member and having a rear end connected to a second intermediate connecting point of a first rear pillar member; and
a second side reinforcing member having a front end connected to a third intermediate connecting point of a second front pillar member and having a rear end connected to a fourth intermediate connecting point of a second rear pillar member.

10. A vehicle body comprising:
a front structure;
a passenger compartment;
a front suspension mounting section;
a front load absorption member having a side surface fixed to an outer side surface of the front suspension mounting section;
a pillar member having a front end connected to a front-end upper surface of the front load absorption member;
a side reinforcing member having a front end connected to a first intermediate connecting point of the pillar member at a rear surface of the pillar member, wherein a rear end of the front load absorption member is connected to a second intermediate connecting point of the side reinforcing member at a front surface of the side reinforcing member;
a truss support structure provided between the front structure and the passenger compartment;
a first fastening plate fixed to the front end of the side reinforcing member;
a second fastening plate fixed to the front end of the pillar member; and a third fastening plate fixed to the rear end of the front load absorption member.

11. The vehicle body according to claim 10, wherein the truss support structure has a triangular shape.

12. The vehicle body according to claim 10, wherein the pillar member connected to the front suspension mounting section has a tubular shape having a closed cross-sectional structure.

13. The vehicle body according to claim 10, further comprising:

a rear structure;

a rear suspension mounting section;

a rear load absorption member having a side surface fixed to an outer side surface of the rear suspension mounting section;

a connecting member disposed to extend in a lateral direction, wherein a rear end of the rear load absorption member is connected to a front surface of the connecting member, and wherein a rear end of the pillar member is connected to an upper surface of an end of the connecting member;

a rear end of the side reinforcing member connected to a third intermediate connecting point of the pillar member at a front surface of the pillar member, wherein a front end of the rear load absorption member is connected to a fourth intermediate connecting point of the side reinforcing member at a rear surface of the side reinforcing member; and a second truss support structure provided between the rear structure and the passenger compartment.

14. The vehicle body according to claim 13, wherein the second truss support structure has a triangular shape.

15. The vehicle body according to claim 13, further comprising fastening plates fixed to an end of each of the rear load absorption member, the rear end of the side reinforcing member, and the the rear end of the pillar member.

* * * * *